(12) United States Patent
Koide

(10) Patent No.: US 8,507,859 B2
(45) Date of Patent: Aug. 13, 2013

(54) OPTICAL ARRANGEMENT OF INFRARED CAMERA

(75) Inventor: Atsushi Koide, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 13/400,906

(22) Filed: Feb. 21, 2012

(65) Prior Publication Data

US 2012/0211655 A1 Aug. 23, 2012

(30) Foreign Application Priority Data

Feb. 22, 2011 (JP) .................................. 2011-036082

(51) Int. Cl.
| | | |
|---|---|---|
| *G02F 1/01* | (2006.01) | |
| *G01J 5/02* | (2006.01) | |
| *G02B 13/14* | (2006.01) | |
| *G02B 9/12* | (2006.01) | |

(52) U.S. Cl.
USPC ....... 250/330; 250/339.02; 359/356; 359/784

(58) Field of Classification Search
USPC .................. 250/330, 339.02; 359/356, 784
See application file for complete search history.

(56) References Cited

U.S. PATENT DOCUMENTS

| | | | |
|---|---|---|---|
| 6,133,569 A | 10/2000 | Shoda et al. | |
| 7,348,562 B2 * | 3/2008 | Irani | 250/339.02 |
| 8,237,097 B2 * | 8/2012 | Iwane | 250/201.2 |
| 2009/0067041 A1 | 3/2009 | Izumi | |

FOREIGN PATENT DOCUMENTS

| | | | |
|---|---|---|---|
| JP | 10281864 A | 10/1998 | |
| JP | 200963942 A | 3/2009 | |
| JP | 2010261801 A | 11/2010 | |

* cited by examiner

*Primary Examiner* — David Porta
*Assistant Examiner* — Faye Boosalis
(74) *Attorney, Agent, or Firm* — The Webb Law Firm

(57) ABSTRACT

Provided is an optical arrangement of the infrared camera comprising a lens unit in which a lens is supported by a frame body, an infrared detector module in which an infrared detector for detecting amount of an infrared ray transmitted through the lens as a heat and converting the infrared rays to an image signal is sealed in a housing having a window portion, and a shutter provided between the lens and the infrared detector module. A detector surface of the infrared detector, the window portion, the shutter, and the lens are arranged such that an inclination angle of a virtual straight line which connects each corner portion of the detector surface, the window portion and a maximum aperture of the shutter, and edge portion of an effective lens area of a lens closest to the shutter against to an optical axis is 25° to 35°, is adopted.

3 Claims, 1 Drawing Sheet

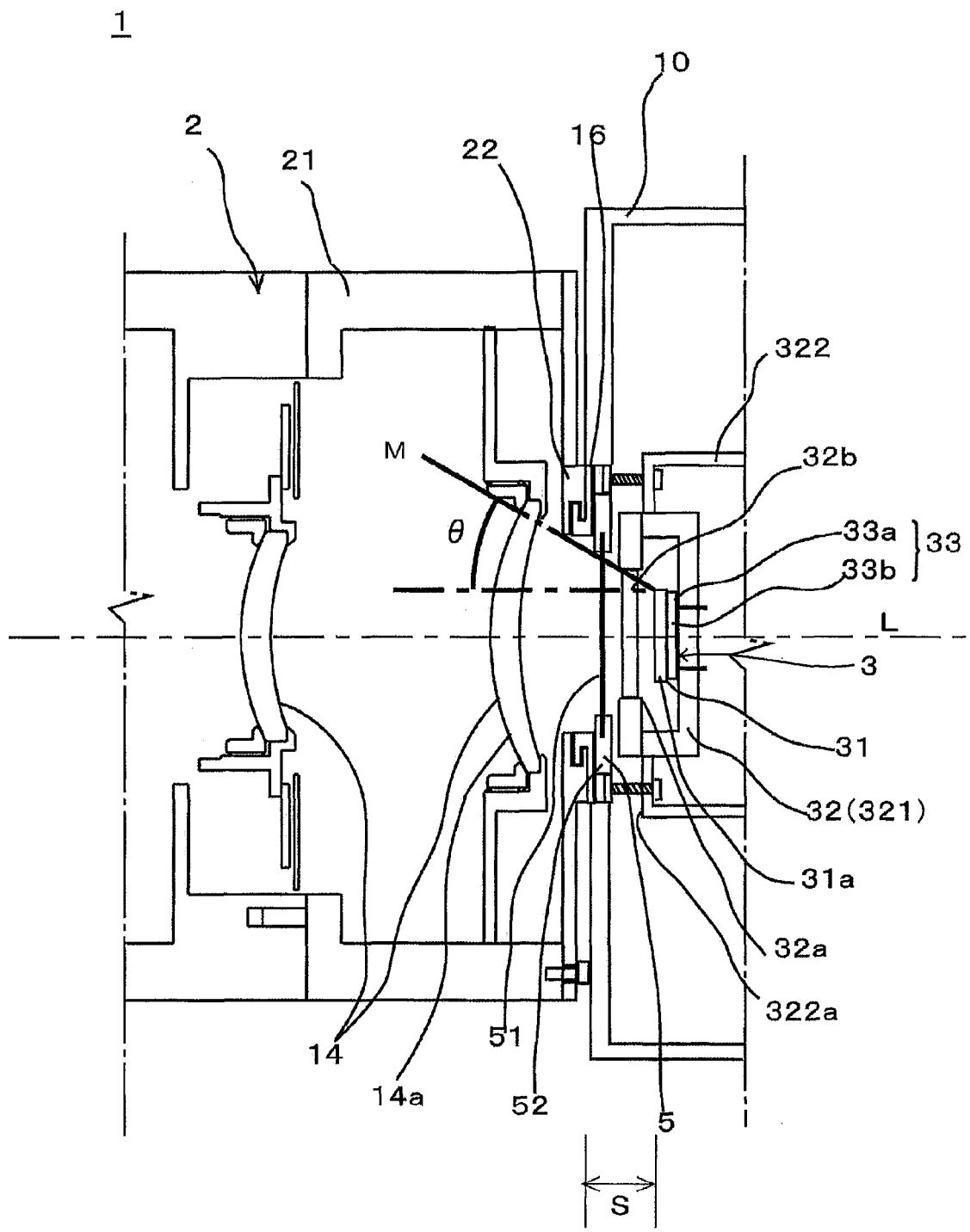

OPTICAL ARRANGEMENT OF INFRARED CAMERA

BACKGROUND OF THE INVENTION

1. Field of the Invention

The present invention relates to an optical arrangement of an infrared camera for detecting an infrared ray and converting the infrared rays to an image signal.

2. Background Art

An infrared camera detecting a radiant energy of far-infrared, mid-infrared, near-infrared and converting the radiant energy to an image is used for, for example, detecting a person and an animal in the dark for security monitoring, car driving or disaster. As an imaging method for an infrared camera, for example, a thermal-type infrared image sensor which thermally detects an infrared ray is used as an imaging unit as disclosed in Japanese Patent Laid-Open No. 10-281864. The thermal-type infrared camera disclosed in Japanese Patent Laid-Open No. 10-281864 includes an imaging unit is made by thermal coupling a temperature detection unit whose physical properties change according to the temperature and an infrared absorbing layer which generates heat according to the amount of an entered infrared rays. When the infrared absorbing layer generates heat by the entered infrared ray, the heat elevates the temperature of the temperature detection unit and change physical properties of the temperature detection unit which can be detected as a current or volt change, and then output a current or volt change as an electric signal for an amount of the infrared ray.

Conventional infrared cameras such as a security camera for fixed-point monitoring and a night-vision camera for an automobile are capable of wide-angle imaging, but can just judge the presence or absence of people and/or animals, i.e. the definition is poor. However, for lenses used in an infrared camera, high definition is required and anticipation for interchangeable lenses that can be selectively used for the purposes, wide-angle or high-magnification, and other intended purposes almost same with a visible light camera depending on requirement is increasing in recent years.

For example, Japanese Patent Laid-Open No. 2009-63942 discloses an imaging apparatus including a lens unit for a far-infrared camera lens having a plurality of lenses designed to be wide angle and an infrared detector. A lens for the infrared camera is made of germanium which can transmit an infrared ray. These lenses for infrared cameras have a high correlation between the temperature and the refractive index of the lens material, and hence even a slight change in temperature tends to change refractive index of the lens material to result defocusing. Further, the infrared detector is affected by the surrounding temperature change. So, in the infrared cameras, such a measure in which a shutter which opens and closes in a predetermined interval is provided between the lens and the detector (two-dimensional detector); the temperature of the two-dimensional detector is corrected in a state in which the shutter is closed; an output is obtained from the two-dimensional detector immediately just after the shutter opens; and thereby the reduction in imaging accuracy due to temperature change around the two-dimensional detector is prevented as in an infrared ray imaging system disclosed in Japanese Patent Laid-Open No. 2010-261801.

In the infrared cameras for vehicle-mounting or mobile use, improved imaging accuracy and downsizing are required. However, in the infrared camera detecting amount of the infrared rays as a heat, an infrared detector should be disposed in a vacuum chamber or a shutter should be provided for temperature control as described above. That is, increasing in size of the apparatus was inevitable to improve the imaging accuracy.

Then, an object of the present invention is to provide an optical arrangement of an infrared camera having both an improved imaging accuracy and a reduced size of the apparatus.

BRIEF DESCRIPTION OF THE DRAWINGS

FIG. 1 is a cross sectional view illustrating an optical arrangement of an infrared camera according to the present invention.

SUMMARY OF THE INVENTION

As a result of intensive studies of the present inventors, the object is achieved by adopting the optical arrangement of an infrared camera described below.

The optical arrangement of the infrared camera according to the present invention comprises a lens unit in which a lens is supported by a frame body; an infrared detector module in which an infrared detector for detecting an infrared ray transmitted through the lens as a heat and converting the infrared rays to an image signal which is sealed in a housing having a window portion; and a shutter provided between the lens and the infrared detector module, wherein a detector surface of the infrared detector, the window portion, the shutter, and the lens are arranged such that an inclination angle of the virtual straight line which connects each corner portion of the detector surface of the infrared detector, the window portion and a maximum aperture of the shutter, and edge portion of an effective lens area of a lens closest to the shutter against to an optical axis is 25° to 35°.

In the infrared camera according to the present invention, the lens unit is preferable to be an interchangeable lens unit which makes a lens mount gear to a camera mount of a camera main body, and the outer periphery edges of openings of the lens mount of the interchangeable lens unit and the camera mount of the camera main body locates on the virtual straight line.

In the optical arrangement of the infrared camera according to the present invention, it is preferable that a distance in an optical axis direction between a bonding surface gearing the camera mount with the lens mount and the detector surface of the infrared detector is 10 mm to 15.

The optical arrangement of the infrared camera according to the present invention can make downsizing possible while improving the imaging accuracy by arranging the detector surface of the infrared detector, the window portion, a shutter, and a lens such that the inclination angle between an optical axis and a virtual straight line which connects each edge portion of the detector surface of the infrared detector, the window portion, a maximum aperture of the shutter, and an effective lens area of a lens is 25° to 35°.

DETAILED DESCRIPTION OF THE PREFERRED EMBODIMENT

Then, a preferred embodiment of an optical arrangement of an infrared camera according to the present invention will be described. FIG. 1 is a cross sectional view illustrating the embodiment of the optical arrangement of the infrared camera according to the present invention. An infrared camera 1 is used particularly for imaging mid-infrared and far-infrared, and comprises a lens unit 2, an infrared detector module 3, and a shutter unit 5. Further, the optical arrangement of the infrared camera according to the present invention is characterized in arranging the detector surface of the infrared detector, the window portion, the shutter, and the lens such that the inclination angle of the virtual straight line which connects each corner portion of the detector surface of the infrared detector, the window portion and a maximum aperture of the shutter, and edge portion of an effective lens area of a lens closest to the shutter against to an optical axis is 25° to 35°. First, the lens unit 2, the infrared detector module 3, and the shutter unit 5 will be described.

In the lens unit 2, a plurality of lenses 14 are supported along an optical axis L by a frame body 21; a zooming lens, a focusing lens, and the like in the lenses 14 are provide movable in the optical axis direction. Further, a lens mount 22 is disposed in an end portion of the lens unit 2 on an image focusing side and is geared to a camera mount 16 of a camera main body 10 for mounting to the camera main body 10. In the present embodiment, the mount is a bayonet mount. In the present embodiment, the lens unit 2 is an interchangeable lens attachable to and detachable from the camera main body 10 including an infrared detector module 3. However, the present invention can also achieve an effect in an infrared camera with the lens unit fixed to the camera main body.

The infrared detector module 3 is disposed in the camera main body 10 and includes an infrared detector 31 that detects an infrared ray transmitted through the lens 14 as a heat and converting amount of the infrared rays to an image signal. The infrared detector module 3 includes the infrared detector 31 and a housing 32 for containing the infrared detector 31.

The infrared detector 31 is preferable to be a bolometer, a thermopile, a thermistor, or the like from the point of view of the imaging performance and the installation environment. The infrared detector 31 is disposed in a first housing 321 and includes a detector surface 31a for detecting an infrared ray. Specifically, the detector surface 31a is disposed in a position facing an opening 32a of the first housing 321, and a window pane 32b made of germanium is fitted in and bonded to the opening 32a and is subjected to pressure reduction, whereby the infrared detector 31 is vacuum sealed in the first housing 321. The detector surface 31a of the bolometer (infrared detector 31) may be a thin film made of a semiconductor such as silicon, germanium or the like; a metal such as platinum, nickel or the like; a superconductor such as niobium, tin or the like; and a dielectric such as chalcogenide glass or the like.

The infrared detector 31 which detects amount of the infrared rays as a heat is maintained at a desired temperature in order to enhance the sensitivity and the signal-to-noise ratio. For this purpose, the infrared detector module 3 includes a temperature control unit 33. The temperature control unit 33 includes a temperature control device 33a for controlling temperature elevated by thermal detection on a detecting surface 31a of the infrared detector 31 to a predetermined temperature; and a heat spreader 33b for spreading heat absorbed by the temperature control device 33a to outside the housing 32. The present embodiment uses a peltier device as the temperature control device 33a. The heat spreader 33b is a heat transfer member connected to the temperature control device 33a, and the temperature control device 33a controls the temperature of the detecting surface 31a of the infrared detector 31, whereby the generated heat is spreaded outside the first housing 321. In the present embodiment, the first housing 321 is made to comprise a surface except the surface having the window portion 32a (surface facing the shutter 51) is made of aluminum and the aluminum portion of the first housing 321 is referred to as the heat spreader 33b.

Next, the housing 32 of the infrared detector module 3 includes the first housing 321 for containing the infrared detector 31; and a second housing 322 enclosing the outer peripheral portion of the first housing 321 including at least the heat spreader 33b. The second housing 322 is provided to prevent the heat transfer from the heat spreader 33b to outside of the camera main body 10. Note that in the present embodiment, considering the thermal insulation of the side surface and imaging surface sides, the second housing 322 is made of ceramics and the surface having the opening 32a is made of metal. Note also that the first housing 321 is made of aluminum so as to make heat spread to outside easy.

The shutter unit 5 is a unit attached to the frame body 52 in a state in which the shutter 51 can open and close. The shutter unit 5 is provided between the lens unit 2 and the infrared detector module 3; and the shutter 51 opens and closes at a predetermined interval. In the case of the infrared camera detecting the amount of an infrared ray as a heat, the infrared detector 31 detects the temperature distribution on the object side, whereby the infrared detector 31 is required to be maintained at a reference temperature in order to enhance the imaging performance. Then, the shutter 51 set at the reference temperature is provided between the lens 14 and the infrared detector 31, and the shutter 51 opens and closes in a predetermined interval, whereby the temperature of the infrared detector 31 is corrected to the reference temperature.

In the infrared camera, incident infrared rays from the object side and transmitted through a plurality of lenses 14 of the lens unit 2 is focused on the detector surface 31a of the infrared detector module 3. The infrared detector 31 detects the amount of an infrared ray focused on the detector surface 31a as the temperature distribution and transfers the detected signal to imaging unit (not shown) for image processing. Here, the shutter 51 opens and closes in a predetermined interval, whereby the temperature of the infrared detector 31 is corrected to the reference temperature.

Next, the optical arrangement will be described. In the optical arrangement of the infrared camera according to the present invention, as illustrated in FIG. 1, the straight line connecting each corner portion of the detector surface 31a of the infrared detector 31, the window portion 32b and a maximum aperture of the shutter 51, and edge portion of an effective lens area of a lens 14a closest to the shutter is defined as a virtual straight line M. The detector surface 31a, the window portion 32b, the shutter 51, and the lens 14a closest to the shutter are arranged in this order in such a manner that an inclination angle θ of the virtual straight line M against to the optical axis L is 25° to 35°. More specifically, in the sectional view illustrated is FIG. 1, the inclination angle θ of the virtual straight line which connects each edge portion of the detector surface 31a, the window portion 32b, a maximum aperture of the shutter 51, and an effective lens area of a lens 14a closest to the shutter against to an optical axis is 25° to 35°; and on the virtual straight line M, each edge portion of the detector surface 31a, the window portion 32b, the maximum aperture of the shutter 51, and the effective lens area of the lens 14a closest to the shutter are arranged.

When the inclination angle θ of the virtual straight line M against to the optical axis L is less than 25°, the length in the optical axis direction for the arrangement cannot be made short, whereby the size reduction of the infrared camera cannot be achieved or a desired F value cannot be maintained, i.e. the downsizing nor improvement in imaging accuracy cannot be achieved. On the other hand, when the inclination angle θ of the virtual straight line M against to the optical axis L exceeds 35°, each area of the detector surface 31a, the window portion 32b, the shutter 51, and the effective lens area of the lens 14a closest to the shutter should be made large. So, it is not preferable because the infrared camera is made larger in size and heavier in weight. Thus, the inclination angle θ of the virtual straight line M against to the optical axis L is more preferably 26° to 32°.

When an interchangeable lens unit is used as the lens unit 2, the lens mount 22 is geared to the camera mount 16 of the camera main body 10. In this case, when each outer periphery edges of opening of the lens mount 22 of the interchangeable lens unit and the camera mount 16 of the camera main body 10 is positioned on the virtual straight line M, unnecessary infrared rays such as an infrared ray existing in the lens unit 2 from being incident thereon can be prevented.

Further, in the optical arrangement of the infrared camera 1 according to the present invention, as demonstrated by symbol S in FIG. 1, the spacing distance S between the bonding surface gearing the lens mount 22 to the camera mount 16; and the detector surface 31a of the infrared detector 31 is 10 mm to 15 mm in the optical axis direction. The bonding surface gearing the lens mount 22 to the camera mount 16 refers to a surface perpendicular to the optical axis L of each mount in a state in which the lens mount 22 is geared to the camera mount 16 and the respective surfaces contact each other. In the infrared camera, the shutter unit 5 is indispensable. Furthermore, the lens 14 and the infrared detector 31 cannot be placed close to each other in order to prevent a temperature change due to respective heat because it is important to control each temperature. Accordingly, the length in the optical axis direction cannot be reduced in view of the mechanical matters. However, the optical arrangement of the infrared camera according to the present invention can reduce the spacing S between the bonding surface gearing the lens mount 22 to the camera mount 16 and the detector surface 31a of the infrared detector 31 to be very small such as 10 mm to 15 mm in the optical axis direction. Furthermore, by arranging each edge portions of the lens 14a closest to the shutter, the shutter 51, the window portion 32b, and the detector surface 31a of the infrared detector 31 on the virtual straight line M, an optical arrangement in which the F value can be maintained at 1.0 and the length in the optical axis direction and the size in the radial direction of the lens can be reduced can be achieved.

The optical arrangement of the infrared camera according to the present invention can be adopted in an infrared camera with an interchangeable lens unit or a fixed lens unit. Further, the optical arrangement of the infrared camera according to the present invention can achieve an infrared camera having improved imaging accuracy and size reduction as well as reduced weight. Thus, the optical arrangement of the infrared camera according to the present invention can contribute to reduction in size and improvement in performance as not only a vehicle-mounted or mobile infrared camera but also a security camera for crime prevention.

The invention claimed is:

1. An optical arrangement of an infrared camera comprising:
   a lens unit in which a lens is supported by a frame body;
   an infrared detector module in which an infrared detector for detecting an infrared ray transmitted through the lens as a heat and converting the infrared rays to an image signal which is sealed in a housing having a window portion; and
   a shutter provided between the lens and the infrared detector module, wherein
   a detector surface of the infrared detector, the window portion, the shutter, and the lens are arranged such that an inclination angle of a virtual straight line which connects each corner portion of the detector surface of the infrared detector, the window portion and a maximum aperture of the shutter, and an edge portion of an effective lens area of a lens closest to the shutter against to an optical axis is 25° to 35°.

2. The optical arrangement of the infrared camera according to claim 1, wherein
   the lens unit is an interchangeable lens unit which makes a lens mount gear to a camera mount of a camera main body, and
   the outer periphery edges of the openings in the lens mount of the interchangeable lens unit and the camera mount of the camera main body locates on the virtual straight line.

3. The optical arrangement of the infrared camera according to claim 1, wherein
   a distance in an optical axis direction between a bonding surface gearing the camera mount to the lens mount and the detector surface of the infrared detector is 10 mm to 15 mm.

* * * * *